United States Patent
Wegerich et al.

(10) Patent No.: US 6,952,662 B2
(45) Date of Patent: Oct. 4, 2005

(54) SIGNAL DIFFERENTIATION SYSTEM USING IMPROVED NON-LINEAR OPERATOR

(75) Inventors: Stephan W. Wegerich, Glendale Heights, IL (US); Alan D. Wilks, Mount Prospect, IL (US); John D. Nelligan, Mount Prospect, IL (US)

(73) Assignee: SmartSignal Corporation, Lisle, IL (US)

( * ) Notice: Subject to any disclaimer, the term of this patent is extended or adjusted under 35 U.S.C. 154(b) by 599 days.

(21) Appl. No.: 09/780,561

(22) Filed: Feb. 12, 2001

(65) Prior Publication Data

US 2002/0055826 A1 May 9, 2002

Related U.S. Application Data

(60) Provisional application No. 60/193,228, filed on Mar. 30, 2000.

(51) Int. Cl.$^7$ .............................................. G06F 17/50
(52) U.S. Cl. ............................. 703/2; 702/182; 700/29
(58) Field of Search ................................ 702/189, 182; 703/2; 706/15, 26; 700/28, 29, 47

(56) References Cited

U.S. PATENT DOCUMENTS

| | | |
|---|---|---|
| 3,045,221 A | 7/1962 | Roop |
| 4,336,595 A | 6/1982 | Adams et al. |
| RE31,750 E | 11/1984 | Morrow |
| 4,480,480 A | 11/1984 | Scott et al. |
| 4,639,882 A | 1/1987 | Keats |
| 4,707,796 A | 11/1987 | Calabro et al. |
| 4,761,748 A | 8/1988 | Le Rat et al. |
| 4,796,205 A | 1/1989 | Ishii et al. |
| 4,823,290 A | 4/1989 | Fasack et al. |
| 4,841,456 A | 6/1989 | Hogan, Jr. et al. |

(Continued)

FOREIGN PATENT DOCUMENTS

WO    WO 00/67412    11/2000

OTHER PUBLICATIONS

"MSET Modeling Of Crystal River–3 Venturi Flow Meters" by J. P. Herzog, S. W. Wegerich, K. C. Gross, and F. K. Bockhorst, 6th International Conference on Nuclear Engineering, ICONE–6169, May 10–14, 1998, Copyright © 1998 ASME (12 pp).

(Continued)

*Primary Examiner*—Thai Phan
(74) *Attorney, Agent, or Firm*—Fitch, Even, Tabin & Flannery

(57) ABSTRACT

A system for detecting subtle differences in a signal in a set of linearly and/or non-linearly related signals that characterize a sensor-instrumented machine, process or living system. The system employs an improved similarity operator for signal differentiation. Signals or data representative of several linearly and/or non-linearly related parameters that describe a machine, process or living system are input to the inventive system, which compares the input to acceptable modeled states. If one or more of the input signals or data are different than expected, given the relationships between the parameters, the inventive system will indicate that difference. The system can provide expected parameter values, as well as the differences between expected and input signals; or the system can provide raw measures of similarity between the collection of input signals and the collection of acceptable modeled states. The system can be embodied in software or in a micro-controller.

47 Claims, 10 Drawing Sheets

U.S. PATENT DOCUMENTS

| | | | |
|---|---|---|---|
| 4,931,977 A | * | 6/1990 | Klemes .................... 702/195 |
| 4,937,763 A | | 6/1990 | Mott |
| 5,003,950 A | | 4/1991 | Kato et al. |
| 5,005,147 A | * | 4/1991 | Krishen et al. ............... 703/13 |
| 5,025,499 A | | 6/1991 | Inoue et al. |
| 5,052,630 A | | 10/1991 | Hinsey et al. |
| 5,093,792 A | | 3/1992 | Taki et al. |
| 5,113,483 A | | 5/1992 | Keeler et al. |
| 5,119,287 A | | 6/1992 | Nakamura et al. |
| 5,123,017 A | | 6/1992 | Simpkins et al. |
| 5,195,046 A | | 3/1993 | Gerardi et al. |
| 5,210,704 A | | 5/1993 | Husseiny |
| 5,223,207 A | | 6/1993 | Gross et al. |
| 5,251,285 A | | 10/1993 | Inoue et al. |
| 5,285,494 A | | 2/1994 | Sprecher et al. |
| 5,311,562 A | | 5/1994 | Palusamy et al. |
| 5,327,349 A | | 7/1994 | Hoste |
| 5,386,373 A | | 1/1995 | Keeler et al. |
| 5,420,571 A | | 5/1995 | Coleman et al. |
| 5,421,204 A | | 6/1995 | Svaty, Jr. |
| 5,446,672 A | | 8/1995 | Boldys |
| 5,455,777 A | | 10/1995 | Fujiyama et al. |
| 5,459,675 A | | 10/1995 | Gross et al. |
| 5,481,647 A | | 1/1996 | Brody et al. |
| 5,500,940 A | | 3/1996 | Skeie |
| 5,502,543 A | | 3/1996 | Aboujaoude |
| 5,539,638 A | | 7/1996 | Keeler et al. |
| 5,548,528 A | | 8/1996 | Keeler et al. |
| 5,553,239 A | | 9/1996 | Heath et al. |
| 5,586,066 A | | 12/1996 | White et al. |
| 5,600,726 A | | 2/1997 | Morgan et al. |
| 5,629,878 A | | 5/1997 | Kobrosly |
| 5,638,413 A | | 6/1997 | Uematsu et al. |
| 5,657,245 A | | 8/1997 | Hecht et al. |
| 5,663,894 A | | 9/1997 | Seth et al. |
| 5,668,944 A | | 9/1997 | Berry |
| 5,671,635 A | | 9/1997 | Nadeau et al. |
| 5,680,409 A | | 10/1997 | Qin et al. |
| 5,682,317 A | | 10/1997 | Keeler et al. |
| 5,699,403 A | | 12/1997 | Ronnen |
| 5,708,780 A | | 1/1998 | Levergood et al. |
| 5,710,723 A | | 1/1998 | Hoth et al. |
| 5,727,144 A | | 3/1998 | Brady et al. |
| 5,748,469 A | | 5/1998 | Pyötsiä |
| 5,761,090 A | | 6/1998 | Gross et al. |
| 5,764,509 A | | 6/1998 | Gross et al. |
| 5,774,379 A | | 6/1998 | Gross et al. |
| 5,787,138 A | | 7/1998 | Ocieczek et al. |
| 5,790,977 A | | 8/1998 | Ezekiel |
| 5,796,633 A | | 8/1998 | Burgess et al. |
| 5,822,212 A | | 10/1998 | Tanaka et al. |
| 5,845,230 A | | 12/1998 | Lamberson |
| 5,864,773 A | | 1/1999 | Barna et al. |
| 5,895,177 A | | 4/1999 | Iwai et al. |
| 5,905,989 A | | 5/1999 | Biggs |
| 5,909,368 A | | 6/1999 | Nixon et al. |
| 5,913,911 A | | 6/1999 | Beck et al. |
| 5,930,779 A | | 7/1999 | Knoblock et al. |
| 5,933,352 A | | 8/1999 | Salut |
| 5,933,818 A | | 8/1999 | Kasravi et al. |
| 5,963,884 A | | 10/1999 | Billington et al. |
| 5,970,430 A | | 10/1999 | Burns et al. |
| 5,987,399 A | | 11/1999 | Wegerich et al. |
| 5,995,916 A | * | 11/1999 | Nixon et al. |
| 6,006,260 A | * | 12/1999 | Barrick, Jr. et al. |
| 6,023,507 A | * | 2/2000 | Wookey |
| 6,026,348 A | * | 2/2000 | Hala |
| 6,049,827 A | * | 4/2000 | Sugauchi et al. |
| 6,104,965 A | * | 8/2000 | Lim et al. |
| 6,119,111 A | * | 9/2000 | Gross et al. .................. 706/15 |
| 6,128,543 A | * | 10/2000 | Hitchner |
| 6,181,975 B1 | * | 1/2001 | Gross et al. .................. 700/29 |
| 2002/0087290 A1 | * | 7/2002 | Wegerich et al. |
| 2002/0091499 A1 | * | 7/2002 | Wegerich et al. |
| 2003/0109951 A1 | * | 6/2003 | Hsiung et al. |

OTHER PUBLICATIONS

"Application Of A New Technique For Modeling System Behavior" by Paul J. O'Sullivan, presented at the ISA Symposium, Edmonton, Alberta, May 1, 1991, © Copyright 1991 Instrument Society of America (21 pp.).

"A Universal, Fault–Tolerant, Non–Linear Analytic Network For Modeling And Fault Detection," by J. E. Mott, R. W. King, L. R. Monson, D. L. Olson, and J. D. Staffon, Proceedings of the 8th Power Plant Dynamics, Control & Testing Symposium, Knoxville, Tennessee, May 27–29, 1992 (14 pp.).

ModelWare™ Product Review by Robert D. Flori, reprinted from Computerized Investing, Sep./Oct. 1992, vol. XI, No. 5, copyright by The American Association of Individual Investors (pp. 8–10).

ModelWare™ A New Approach to Prediction by Ken Tucker, reprinted from PC AI magazine, Jan./Feb. 1993, pp. 14, 15, 30.

"Similarity Based Regression: Applied Advanced Pattern Recognition for Power Plant Analysis," by E. J. Hansen and M. B. Caudiill, presented at the 1994 EPRI Heat Rate Improvement Conference (9 pp.).

"Applied Pattern Recognition For Plant Monitoring And Data Validation," by Ron Griebenow, E. J. Hansen, and A. L. Sudduth, presented at the Fifth International Joint ISA POWID/EPRI Controls and Instrumentation Conference, La Jolla, California, Jun. 19–21, 1995 (11 pp.).

"Model–Based Nuclear Power Plant Monitoring And Fault Detection: Theoretical Foundations," by Ralph M. Singer, Kenny C. Gross, James P. Herzog, Ronald W. King, and Stephan Wegerich, presented at the International Conference on Intelligent System Application to Power Systems (ISAP '97), Jul. 6–10, 1997, Seoul, Korea (pp. 60–65).

"Application Of A Model–Based Fault Detection System To Nuclear Plant Signals," by K. C. Gross, R. M. Singer, S. W. Wegerich, J. P. Herzog, R. VanAlstine, and F. Bockhorst, presented at the International Conference on Intelligent System Application to Power Systems (ISAP '97), Jul. 6–10, 1997, Seoul, Korea (pp. 66–70).

* cited by examiner

SIGNAL DIFFERENTIATION SYSTEM USING IMPROVED NON-LINEAR OPERATOR

CROSS REFERENCE TO RELATED APPLICATIONS

This application claims the benefit of priority under 35 U.S.C. § 119(e) to U.S. Provisional application Ser. No. 60/193,228 filed Mar. 30, 2000.

FIELD OF THE INVENTION

The present invention relates to the monitoring of physical systems, processes or machines, and more particularly to systems and methods for discerning signal differentiation using an operator to detect deviations in one or more sets of signals from monitored sensors.

BACKGROUND OF THE INVENTION

Generally, there is a need to detect when one or more of a set of signals from sensors monitoring a system, whether a machine, process or living system, deviates from "normal." Normal can be an acceptable functioning state, or it can be the most preferred of a set of various acceptable states. The deviation can be due to a faulty sensor, or to a change in the underlying system parameter measured by the sensor, that is, a process upset.

While threshold-type sensor alarms have traditionally been used to detect when parameters indicate that a component has strayed away from normal, acceptable or safe operating conditions, many deviations in sensor or underlying parameter values go unnoticed because threshold detection can only detect gross changes. Often such detection may not occur early enough to avoid a catastrophic failure. In particular, there is a critical need to detect when a component, as indicated by a signal or underlying parameter value, is deviating from an expected value, given its relationship to other system components, i.e., in the monitored machine, process or living system. This detection should occur even though the corresponding signal in question is still well within its accepted gross threshold limits.

A number of methods exist that try to use the relationships between sensors, signals, data or the underlying parameters that correspond thereto, to detect notable component changes that otherwise would be missed by "thresholding." Such methods are often data-intensive and computationally demanding. There is a need for accurate empirical modeling techniques that provide computationally efficient and accurate system state monitoring.

SUMMARY OF THE INVENTION

The present invention provides an improved monitoring system and method for ultrasensitive signal differentiation that achieves the detection of changes to and faults in one or more sensor signals in a set that characterizes an underlying "process or machine." The invention achieves accurate results with improved computational efficiency without relying on thresholding. Therefore, less memory and CPU power are needed to perform the necessary calculations. Also, because of the improved computational efficiency, more data "time-slices" can be processed with a given CPU speed. This is useful particularly in systems where signals or data must be sampled at a high rate, or in an application where the CPU or micro-controller is limited.

An empirical model is developed of the process or machine to be monitored, and in real-time sensor data from the monitored process or machine is compared to estimates of same from the model. The results of the comparison are statistically tested with an ultrasensitive difference test that indicates alerts on a sensor-by-sensor basis, thereby providing early warning of process upsets, sensor failures, and drift from optimal operation, long before these would be noticed by conventional monitoring techniques. According to the invention, an improved similarity operator is used in generating the estimates.

The invention provides an improved operator that can be implemented in software on a variety of systems. A typical implementation would be in a programming language like C or C++ on a Unix or Windows workstation, either as a standalone program sampling data via a National Instruments-like pc-card, or as a part or module of a broader process control software system. The program can be a Windows-like DLL or callable routine, or can comprise an entire suite of presentation screens and settings modification screens. The software can be reduced to a PCMCIA card for addition to a computer with such a port. Then, the data being input to the computation could be fed through a dongle attached to the PCMCIA card. An alternative would be to put the program into microcode on a chip. Input and output of the requisite data to a broader system would depend on the design of the overall system, but it would be well known to circuit designers how to build in the microchip version of this invention. In yet another embodiment, the computation could take place on a server remote (WAN) from the sensors that feed to it. As contemplated in another embodiment, the internet could be used to deliver real-time (or semi-real-time) data to a server farm which would process the data and send back either alarm level data or higher-level messages. In that case, it would become necessary to ensure that the asynchronous messaging "delay" of the internet was of sufficiently unobtrusive to the semi-real-time monitoring taking place over the internet/WAN. For example, bandwidth could be guaranteed so that the asynchronicity of the messaging was not any kind of delay. Alternatively, the sampling rate of the system could be slow enough that the delivery time of Internet messages was negligible in comparison.

Briefly, the present invention relates to a computationally efficient operation for accurate signal differentiation determinations. The system employs an improved similarity operator for signal differentiation. Signals or data representative of several linearly and/or non-linearly related parameters that describe a machine, process or living system are input to the inventive system, which compares the input to acceptable empirically modeled states. If one or more of the input signals or data are different than expected, given the relationships between the parameters, the inventive system will indicate that difference. The system can provide expected parameter values, as well as the differences between expected and input signals; or the system can provide raw measures of similarity between the collection of input signals and the collection of acceptable empirically modeled states.

BRIEF DESCRIPTION OF THE DRAWINGS

The novel features believed characteristic of the invention are set forth in the appended claims. The invention itself, however, as well as the preferred mode of use, further objectives and advantages thereof, is best understood by reference to the following detailed description of the embodiments in conjunction with the accompanying drawings, wherein:

DETAILED DESCRIPTION OF PREFERRED EMBODIMENTS

The present invention is a system, method and program product for monitoring operation of a machine, process, living system or any other such system to accurately predict individual component failures, i.e. component end of life, such that failure or process upset can be anticipated to reduce planned downtime, reduce unplanned downtime and provide for process or product quality optimization.

It is directed to the employment of an improved similarity operator within an empirical modeling engine for use in generating estimates of sensor values for a monitored process or machine based on input of the actual sensor values. Advantageously, the similarity operation carried out in the modeling according to the invention has comparatively low computational needs as compared to other similarity operators that can be used in such an empirical model-based monitoring system, such as is described in U.S. Pat. No. 5,987,399 to Wegerich et al., wherein is disclosed a similarity operator employing computationally intensive trigonometric variables. In particular a representative "training" set of data is compared against monitored signal data in a similarity engine and a statistical significance engine. Techniques for achieving ultrasensitive signal differentiation are similar to what is generically described in U.S. Pat. No. 5,764,509, directed to the application of a sequential probability ratio test ("SPRT"). Parameter data are gathered from signal sensors monitoring a system such as a machine, process or living system. The number of sensors used is not a limiting factor, generally, other than respecting computational overhead. The present invention is highly scalable. Preferably, the sensors should capture component parameters of at least some of the primary "drivers" of the underlying system. Furthermore, all sensor inputs to the system are best interrelated in some fashion (non-linear or linear).

Figure 1:
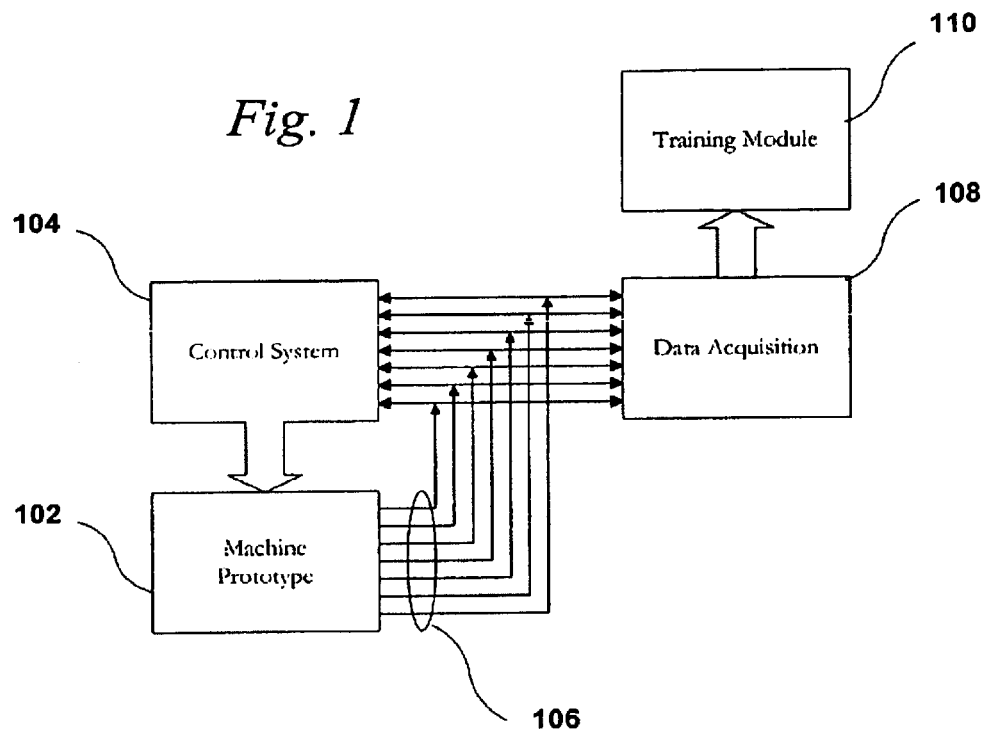
FIG. 1 shows a block diagram of an exemplary laboratory workbench arrangement for gathering process or machine behavior data for distillation.

Turning to FIG. 1, a block diagram of an exemplary laboratory workbench arrangement 100 is shown for gathering process or machine behavior data for distillation. In this example, the monitored system is depicted as a machine prototype 102 and may be, for example, a combustion engine, an electric motor, a pump, a compressor, a refrigerator, and so on. It is understood that, as further indicated herein, the monitored system may be any machine, living system or system carrying out a process. In this example, the machine 102 is termed a prototype, but importantly, its function is to generate sensor data that is substantially the same as the actual parameter values expected in a production model of the machine, as would be measured by the same sensors. Of course, the training may be in situ wherein the prototype is a production model itself, and ideally, not different in any way from other production models. In addition, when sufficient data has already been accumulated, that previously accumulated data may be used as the training data source, the prototype machine being a virtual machine derived from production machines contributing data to the accumulation.

The machine 102 may be connected to and controlled by a control system 104, generally comprising a microcontroller- or microprocessor-based digital system with appropriate analog digital and digital/analog inputs and outputs as are known to those skilled in the art. Machine 102 is instrumented with sensors monitoring machine components or reactions thereto (e.g., chamber temperature or pressure) and providing resultant sensor values along outputs 106. During training, the machine 102 is operated through an expected range of operations, and data acquisition system 108 records values of all sensors 106 with which machine 102 is instrumented. Additionally, control signals from control system 104 may also be recorded by data acquisition system 108, and may be used as "sensor signals" that correlate with the other sensor signals.

Data acquired by data acquisition system 108 can, accordingly, be processed using a computer module 110 for producing a distilled training data set representing the operational ranges of machine 102, using the preferred training method, or other appropriate such methods as may be known in the art.

The monitoring system described herein includes an empirical modeling engine and a statistical decision-making engine supported by a suite of software routines for data preconditioning, training, and post-decision reporting. This system is modular and can be applied separately depending on the requirements of the particular monitoring application. Typically, process monitoring equipment employs sensors having some common characteristics. A sensor data set is acquired as being representative of the normal or desired operation range of the system. The parameters monitored by sensors should be chosen for the model to be correlated, either linearly or nonlinearly. Generally, multiple sensor inputs may be necessary, however, the described algorithms may apply to single sensor applications by using signal decomposition of the single sensor signal into components that can be treated as multiple, correlated inputs for modeling and monitoring. The identification of small deviations in signals from normal operation is provided as indicative of the status of the sensor's associated physical parameter.

Figure 2:
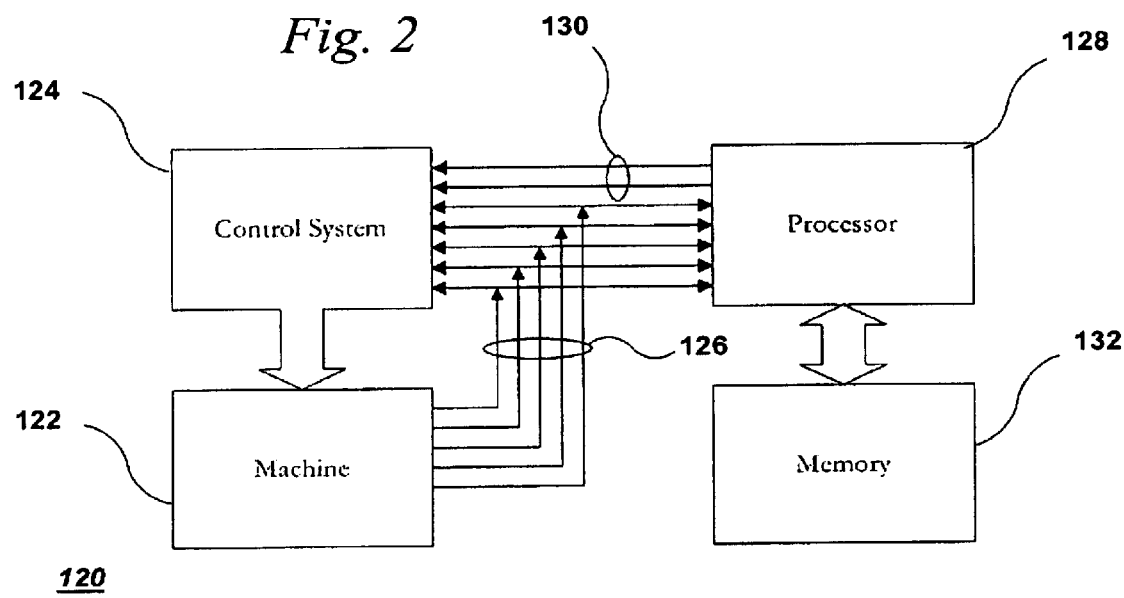
FIG. 2 shows an example of an embodiment of the present invention in an on-board processor.

The inventive monitoring system can be adapted to provide not just monitoring of existing sensor data, but also generation of derived "virtual" sensor data based on other actually-monitored sensors. Thus, an example 120 of an embodiment of the present invention in an on-board processor is shown in FIG. 2, wherein a system, machine or process, represented by machine 122, is controlled by a control system 124 that is located on the machine. Machine 122 is instrumented with sensors for some of the physical or logical parameters of interest that may be controlling the machine, and the outputs for these sensors are shown as output conductors 126, which feed into the control system 124. These are also fed to a processor 128 located within or on the machine, disposed to execute a computing program for monitoring sensor signals and an optional computing program for generating a set 130 of virtual signals on output conductors 126. The processor is connected to a local memory 132, also on or in the machine 122, which stores data comprising the training set distilled to represent the expected operational states of the machine 122. Memory 132 can also advantageously store programs for execution by the processor 128. Virtual signals 130, if included, previously generated by the processor 128 are provided to the control system 124, in lieu of genuine sensor values. Generation of virtual sensor estimates using the improved similarity operator of the present invention can be more fully understood with reference to copending patent application Ser. No. 09/718,592 of Wegerich, filed Nov. 22, 2000, and entitled "Inferential Signal Generation for Instrumented Equipment and Process." Virtual signals may be generated as a cost saving measure to reduce sensor count or for unmonitorable physical or logical parameters of the machine 122.

Processor 128 can also be a part of the control system 124, and in fact can be the processor on which the control system routines are executed, in the event the control system is a digital computed control system. Ideally, the processor 128 and memory 132 are powered by the same power source as the control system 124. However, under certain circumstances, it may also be preferable to provide for a processor 128 and memory 132 independent from another processor and or memory (not shown) of the control system 124, in order to provide for example virtual signals 130 in a timely fashion, as though they were truly instrumented parameters. For example, processor 128 may operate at a higher clock speed than the control system processor.

Figure 3:
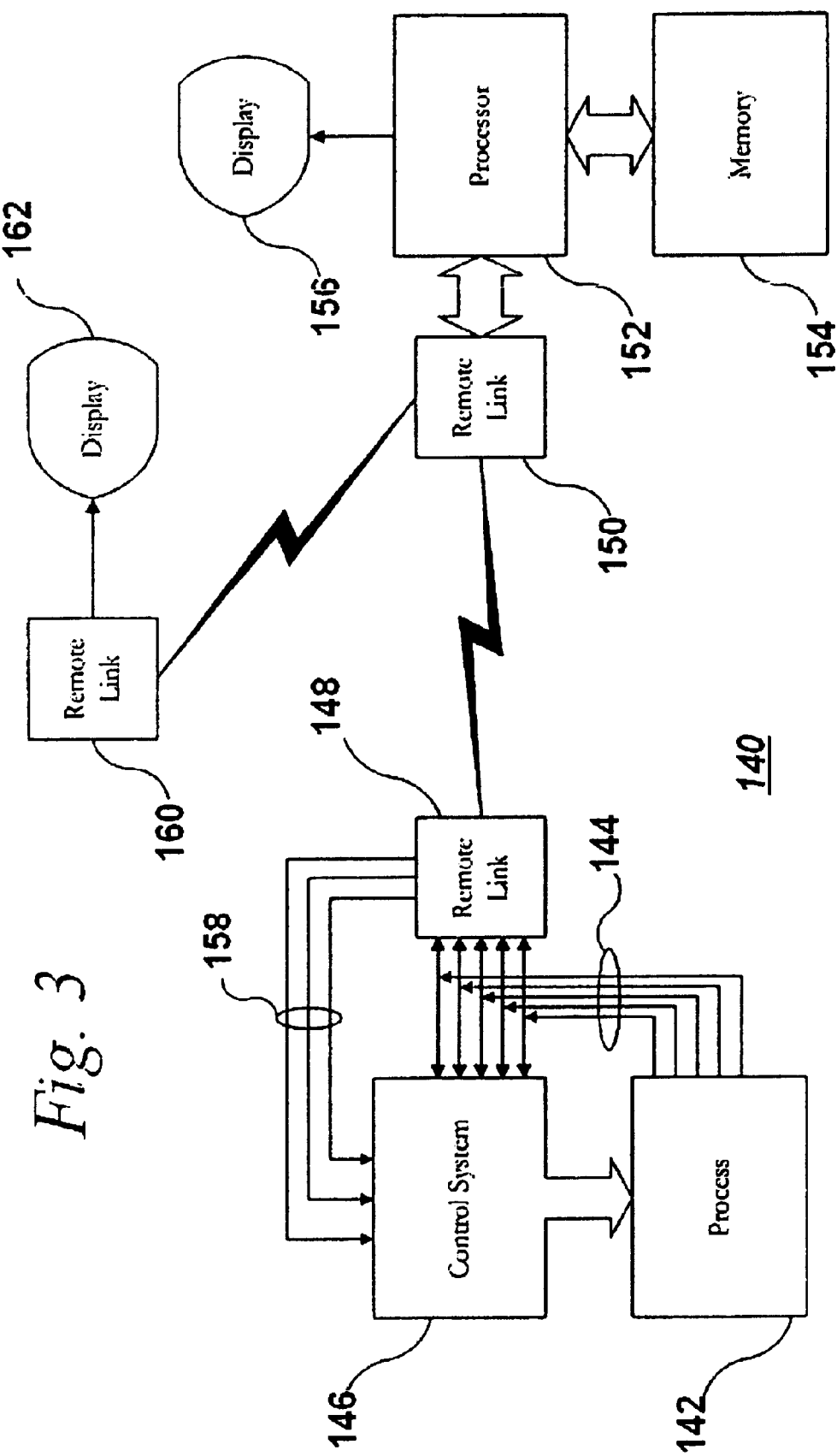
FIG. 3 shows an example embodiment wherein a process is shown to be instrumented with sensors having output leads.

FIG. 3 shows an example embodiment 140, wherein a process 142 is shown to be instrumented with sensors having output leads 144. These leads 144 provide sensor signals to a control system 146 that controls the process. These signals are also provided to a remote communications link 148, which is disposed to communicate digital values of the sensor signals to a second remote communications link 150, located at a physically remote place. A processor 152 is provided, which may comprise a computing system and software, that uses the sensor signals received by link 150 to monitor the process 142 for sensor failures, process upsets or deviations from optimal operation and optionally generate at least one virtual sensor signal indicative of an inferred physical parameter of process 142. A memory 154 is provided to store training set data representative of the expected operational behavior of the process 142, according to the distillation method described above.

Furthermore, a display 156 may be provided at the remote location for displaying data descriptive of the process 142, i.e., sensor signals 144 and any virtual signals derived therefrom or both. The virtual signals generated by processor 152 can also be transmitted from link 150 back to link 148 and input over leads 158 to control system 146 for advantageous control of the process. Data from original sensor signals and or virtual sensor signals (if included) can also be transmitted to a third remote communications link 160, located at yet a third distant place, for display on display 162, thereby providing valuable information concerning the process to interested parties located at neither the physical process site nor at the monitoring system site.

The remote communications links can be selected from a variety of techniques known in the art, including internet protocol based packet communication over the public telecommunications infrastructure, direct point-to-point leased-line communications, wireless or satellite. More specifically, remote links 148,152 and 160 may be internet-enabled servers with application software for accumulating, queuing and transmitting data as messages, and queues for receiving and reconstituting data arriving as messages. Alternatively, communications can be synchronous (meaning in contrast to asynchronous, message-based communications) over a wireless link.

The embodiment of the invention shown in FIG. 3 allows computation of signals using computing resources that are located geographically distant from the system being monitored and/or controlled. One benefit of remote monitoring is that the monitoring and analysis resources may be shared for a multitude of systems, where the memory 154 may hold multiple training sets characterizing the various monitored systems, processes and machines or distributed combinations thereof. Another benefit is that results may be displayed and also potentially used in further analysis by interested parties located distant from the system being monitored.

Figure 4:
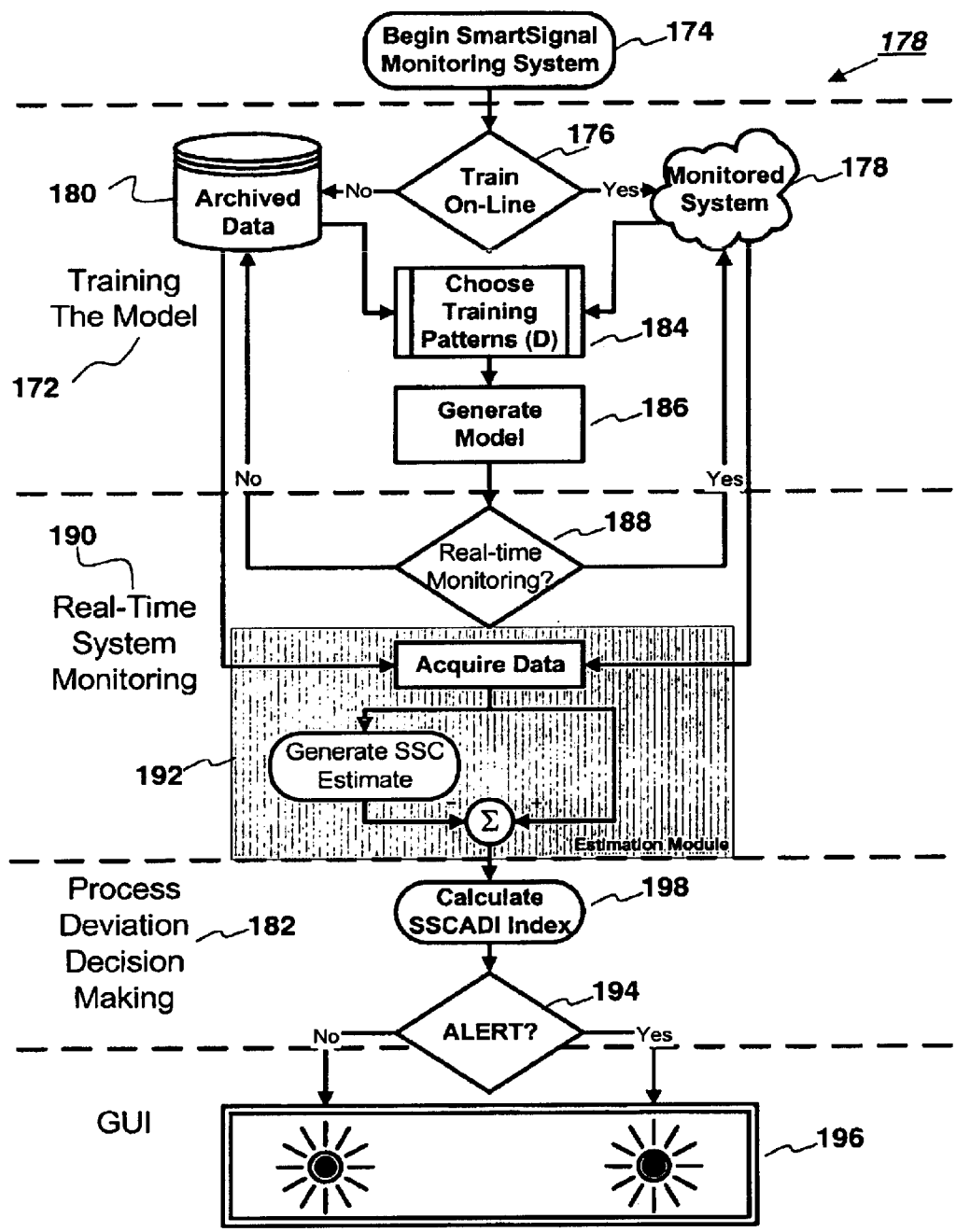
FIG. 4 illustrates an implementation of a statistical modeling operator in accordance with the invention.

A preferred method of employing the improved similarity operator of the present invention is shown in FIG. 4, which illustrates an implementation of the operator according to a method 170 for monitoring a process or machine instrumented with sensors. In a training step 172 a model is derived that captures the normal operating ranges for the sensors. Upon initiating the software system at step 174, training is determined to occur either on-line or not in step 176. Previously archived data 180 may also be used to provide data characteristic of normal or acceptable operation, or data characteristic of normal or acceptable operation may be obtained from the real-time operation of the monitored system 178. According to the method 170, training patterns (the D matrix) are chosen at step 184 to generate the empirical model at 186, as further described below. The training set is a matrix of vectors in which each vector represents one of the normal operating states of the system.

Real time monitoring stage 190 is indicated at step 188, whereupon the model generated at 186 is employed in the steps 192 for estimation. Real-time data is acquired in 192 and an estimate of what the sensor values should be is generated based thereon in view of the model. For each snapshot of data acquired in 192, the similarity operator of the invention is used to compare the actual real-time sensor values to vectors of sensor values in the training set.

The differences between the expected values and real-time sensor signals, i.e., the residual signals formed in 192, are sent to a decision-making engine in the process deviation decision-making step 182. The decision-making engine continuously renders a reliable decision at 194 based on a SSCADI index calculated at 198 over a moving window of successive residual observations, determining whether or not the residual signals reveal a statistically relevant abnormality.

The described embodiment uses a platform with an operating system for real-time monitoring 190 and sampling of the real-time sensor data via a National Instruments feed, with a monitor including an estimation module 192 with a windowing environment to provide feedback in the form of alarms 194 or other high-level messages 196 to an operator of equipment. The program embodying the invention can be written in C or in LabView, a product available from National Instruments Company. The operator portion itself comprises a callable Windows DLL that the LabView software calls. The software may be written as components, including: (1) a training component 172 (for selecting the D matrix from a set previously obtained of "normal" input data), (2) an estimation module component 192 for modeling (to provide the similarity operations both on matrix D and on the real-time input vector, and also to provide an estimated output or an output of the degree of similarity of the vector to the states recognized in the D matrix), and (3) a statistical test component 198 (which tests data such as using SPRT on the similarity measurement or residual between the input and the estimate).

Monitoring begins by providing signal data as vectors, each with as many elements as there are sensors. A given vector represents a "snapshot" of the underlying system parameters at a moment in time or time correlated. Additional pre-processing can be done, if necessary for time correlation to insert a "delay" between cause and an identified effect between sensors. That is to say, for example, if sensor A detects a parameter change that will be reflected at sensor B three "snapshots" later, the vectors can be reorganized such that a given snapshot contains a reading from sensor A at a first moment, and a corresponding reading from sensor B three snapshots later. Each snapshot is representative of a "state" of the underlying system. Methods for time-correlating in this way are known to those skilled in the art.

Figure 5:
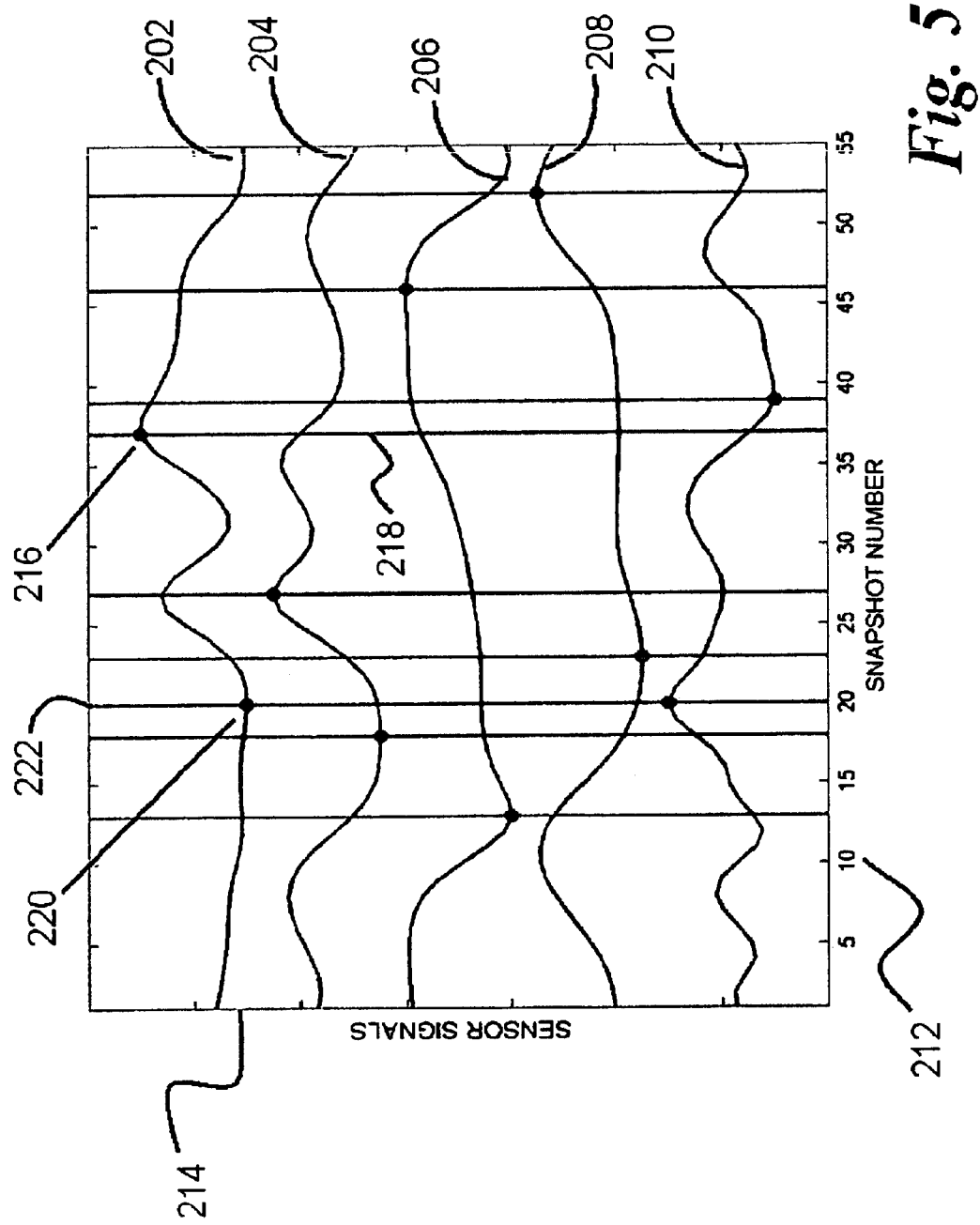
FIG. 5 shows a method for selecting training set vectors for distilling the collected sensor data to create a representative training data set.

Turning to FIG. 5, a method for selecting training set vectors at step 184 is graphically depicted for distilling the collected sensor data to create a representative training data set. In this simple example, five sensor signals 202, 204, 206, 208 and 210 are shown for a process or machine to be monitored. Although the sensor signals 202, 204, 206, 208 and 210 are shown as continuous, typically, these are discretely sampled values taken at each snapshot. As indicated hereinabove, snapshots need not be ordered in any particular order and so, may be ordered in chronological order, parametric ascending or descending order or in any other selected order. Thus, the abscissa axis 212 is the sample number or time stamp of the collected sensor data, where the data is digitally sampled and the sensor data is temporally correlated. The ordinate axis 214 represents the relative magnitude of each sensor reading over the samples or "snapshots."

In this example, each snapshot represents a vector of five elements, one reading for each sensor in that snapshot. Of all the collected sensor data from all snapshots, according to this training method, only those five-element snapshots are included in the representative training set that contain either a global minimum or a global maximum value for any given sensor. Therefore, the global maximum 216 for sensor 202 justifies the inclusion of the five sensor values at the intersections of line 218 with each sensor signal 202, 204, 206, 208, 210, including global maximum 216, in the representative training set, as a vector of five elements. Similarly, the global minimum 220 for sensor 202 justifies the inclusion of the five sensor values at the intersections of line 222 with each sensor signal 202, 204, 206, 208, 210. Collections of such snapshots represent states the system has taken on. The pre-collected sensor data is filtered to produce a "training" subset that reflects all states that the system takes on while operating "normally" or "acceptably" or "preferably." This training set forms a matrix, having as many rows as there are sensors of interest, and as many columns (snapshots) as necessary to capture all the acceptable states without redundancy.

Figure 6:
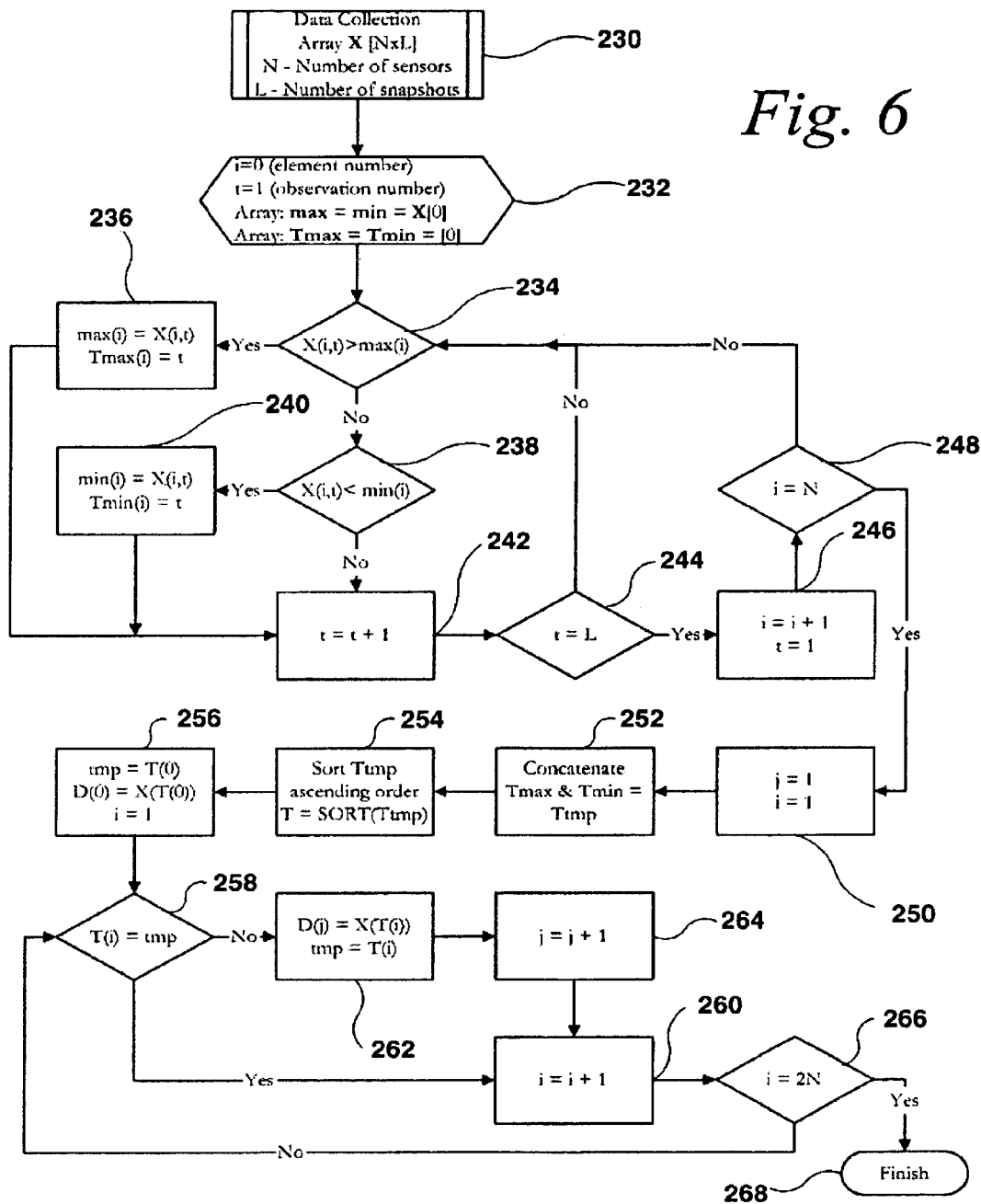
FIG. 6 shows computation of an expected "snapshot," given the real-time actual "snapshot" of the underlying system.

Turning to FIG. 6, the training method of FIG. 5 is shown in a flowchart. Data collected in step 230 has N sensors and L observations or snapshots or temporally related sets of sensor data that comprise an array X of N rows and L columns. In step 232, an element number counter i is initialized to zero, and an observation or snapshot counter t is initialized to one. Two arrays "max" and "min" for containing maximum and minimum values respectively across the collected data for each sensor, are initialized to be vectors each of N elements which are set equal to the first column of X. Two additional arrays Tmax and Tmin for holding the observation number of the maximum and minimum value seen in the collected data for each sensor, are initialized to be vectors each of N elements, all zero.

In step 234, if the sensor value of sensor i at snapshot t in X is greater than the maximum yet seen for that sensor in the collected data, max(i) is updated to equal the sensor value and Tmax(i) stores the number t of the observation in step 236. If not, a similar test is done for the minimum for that sensor in steps 238 and 240. The observation counter t is incremented in step 242. In step 244, if all the observations have been reviewed for a given sensor (t=L), then t is reset and i is incremented (to find the maximum and minimum for the next sensor) in step 246. If the last sensor has been finished (i=N), step 248, then redundancies are removed and an array D is created from a subset of vectors from X.

First, in step 250, counters i and j are initialized to one. In step 252, the arrays Tmax and Tmin are concatenated to form a single vector Ttmp having 2N elements. These elements are sorted into ascending (or descending) order in step 254 to form array T. In step 256, holder tmp is set to the first value in T (an observation number that contains a sensor minimum or maximum). The first column of D is set equal to the column of X corresponding to the observation number that is the first element of T. In the loop starting with decision step 258, the ith element of T is compared to the value of tmp that contains the previous element of T. If they are equal (the corresponding observation vector is a minimum or maximum for more than one sensor), it has already been included in D and need not be included again. Counter i is incremented in step 260. If they are not equal, D is updated to include the column from X that corresponds to the observation number of T(i) in step 262, and tmp is updated with the value at T(i). The counter j is then incremented in step 264. In step 266, if all the elements of T have been checked, then the distillation into training set D has finished, step 266.

Once the D matrix has been determined, in the training phase 172, the preferred similarity engine may begin monitoring the underlying system (122, 142 or 178) and through time, actual snapshots of real sensor values are collected and provided to the similarity engine. The output of the similarity engine can be similarity values, expected values, or the "residual" (being the difference between the actual and expected values).

One or all of these output types are passed to the statistical significance engine, which then determines over a series of one or more such snapshots whether a statistically significant change has occurred as set forth hereinbelow. In other words, it effectively determines if those real values represent a significant change from the "acceptable" states stored in the D matrix. Thus, a vector (Y) of expected values:

$$\vec{y}_{out} = \bar{D} \cdot \vec{W}$$

(i.e., estimates) is determined for the sensors. The expected state vector ($Y_{out}$) is equal to contributions from each of the snapshots in D, which contributions are determined by the weight vector W. The multiplication operation (·) is the standard matrix/vector multiplication operator. W has as many elements as there are snapshots in D. W is determined by:

$$\vec{W} = \frac{\hat{W}}{\left(\sum_{j=1}^{N} \hat{W}(j)\right)}$$

$$\vec{W} = (\overline{D}' \otimes \overline{D})^{-1} \cdot (\overline{D}' \otimes \vec{y}_{input})$$

D is again the training matrix, and D' is the standard transpose of that matrix (i.e., rows become columns). $Y_{input}$ includes the real-time or actual sensor values from the underlying system, and therefore it is a vector snapshot.

The similarity operator $\otimes$ can be selected from a variety of mechanisms for providing a measure of the similarity of one snapshot as compared to another. One general class of similarity operators performs an element for element comparison, comparing a row of the first matrix with a column containing an equal number of elements from the second matrix. The comparison yields a "similarity" scalar value for each pair of corresponding elements in the row/column, and an overall similarity value for the comparison of the row to the column as a whole, e.g., for one snapshot to another.

The similarity operator has been improved in the present invention to define the similarity $s_i$ between ith elements as:

$$\theta_i = \frac{\max(x_i, m_i) - \min(x_i, m_i)}{(\text{Max}_{range} - \text{Min}_{range})}; s_i = 1 - \frac{\theta_i^\lambda}{\rho}$$

where:
- Max(range) is the maximum value of that "sensor" across the matrix (typically across the transpose of the D matrix), that is the maximum value of x in a given column of x in the above matrix, or in other words the maximum value for that corresponding sensor in the training set;
- Min(range) is the minimum value of that "sensor" in the same manner;
- $X_i$=the $i^{th}$ component of the row of the first matrix (x matrix above);
- $M_i$=the $i^{th}$ component of the column of the second matrix (m matrix above);
- $\rho$=an analysis parameter that can be manually varied for enhanced analysis and is defaulted to 1; and
- $\lambda$=a sensitivity analysis parameter that also can be manually varied for enhanced analysis and is defaulted to 1.

Accordingly, vector identity yields $s_i$=1.0 and complete dissimilarity yields $s_i$=0.0. Typically $s_i$ falls somewhere between these two extremes.

Overall similarity of a row to a column is equal to the average (or some other suitable statistical treatment) of the number N (the element count) of $s_i$ values:

$$S = \frac{\sum_{1}^{N} s_i}{N}$$

or alternatively the similarity S of a row to a column can also be calculated:

$$S = 1 - \frac{\left[\left(\sum_{1}^{N} \theta_i\right)/N\right]^\lambda}{\rho}$$

that is, the average of the $\theta_i$, divided by $\rho$, raised to the power of $\lambda$, and subtracted from one. Accordingly, the S values that are summed from $\theta_i$ or $s_i$ are the S values depicted in the result matrix above. This operator, having been described generically above, works as follows in the determination of W. The first factor, $D'\otimes D$, is referred to herein as matrix G, i.e., $$\overline{G} = \overline{D}' \otimes \overline{D}$$

So, for example, with D and its transpose for 4 sensors a, b, c, d and for n training set snapshots are:

$$\overline{D}' = \begin{bmatrix} a_1 & b_1 & c_1 & d_1 \\ a_2 & b_2 & c_2 & d_2 \\ \vdots & \vdots & \vdots & \vdots \\ a_n & b_n & c_n & d_n \end{bmatrix} \quad \overline{D} = \begin{pmatrix} a_1 & a_2 & \cdots & a_n \\ b_1 & b_2 & \cdots & b_n \\ c_1 & c_2 & \cdots & c_n \\ d_1 & d_2 & \cdots & d_n \end{pmatrix}$$

then the matrix G is:

$$\overline{G} = \begin{bmatrix} g_{11} & g_{12} & \cdots & g_{1n} \\ g_{21} & g_{22} & \cdots & g_{2n} \\ \vdots & \vdots & \vdots & \vdots \\ g_{n1} & g_{n2} & \cdots & g_{nn} \end{bmatrix}$$

where, for example, element $g_{12}$ in the matrix G is computed from row 1 of D-transpose ($a_1, b_1, c_1, d_1$) and column 2 of D ($a_2, b_2, c_2, d_2$) as either:

$$S_{12} = \frac{\sum_{i=a,b,c,d} s_i}{4} \text{ or } S_{12} = 1 - \frac{\left[\left(\sum_{i=a,b,c,d} \theta_i\right)/4\right]^\lambda}{\rho}$$

where the elements $s_i$ and $\theta_i$ are calculated as:

$$\theta_a = \frac{\max(a_1, a_2) - \min(a_1, a_2)}{(\text{Max}_a - \text{Min}_a)};$$

$$\theta_b = \frac{\max(b_1, b_2) - \min(b_1, b_2)}{(\text{Max}_b - \text{Min}_b)};$$

$$\theta_c = \frac{\max(c_1, c_2) - \min(c_1, c_2)}{(\text{Max}_c - \text{Min}_c)};$$

$$\theta_d = \frac{\max(d_1, d_2) - \min(d_1, d_2)}{(\text{Max}_d - \text{Min}_d)};$$

$$\text{and } s_i = 1 - \frac{\theta_i^\lambda}{\rho}$$

The resulting matrix G is symmetric around the diagonal, with ones on the diagonal. To further calculate W, the computation of $(D' \otimes Y_{input})$ is performed in a similar fashion, except $Y_{input}$ is a vector, not a matrix:

$$\overline{D}' \otimes \vec{y}_{input} = \begin{bmatrix} a_1 & b_1 & c_1 & d_1 \\ a_2 & b_2 & c_2 & d_2 \\ \vdots & \vdots & \vdots & \vdots \\ a_n & b_n & c_n & d_n \end{bmatrix} \otimes \begin{bmatrix} a_{in} \\ b_{in} \\ c_{in} \\ d_{in} \end{bmatrix} = \begin{bmatrix} S_1 \\ S_2 \\ \vdots \\ S_n \end{bmatrix}$$

The G matrix is inverted using standard matrix inversion, and the result is multiplied by the result of $D' \otimes Y_{input}$. The result is W:

$$\vec{W} = \overline{G}^{-1} \cdot \begin{bmatrix} S_1 \\ S_2 \\ \vdots \\ S_n \end{bmatrix} = \begin{bmatrix} W_1 \\ W_2 \\ \vdots \\ W_n \end{bmatrix}$$

These weight elements can themselves be employed, or expected values for the sensors can be computed, applying the training matrix D to the weight vector W:

$$\vec{y}_{expected} = \overline{D} \cdot \vec{W} = \begin{bmatrix} a_1 & a_2 & \cdots & a_n \\ b_1 & b_2 & \cdots & b_n \\ c_1 & c_2 & \cdots & c_n \\ d_1 & d_2 & \cdots & d_n \end{bmatrix} \cdot \begin{bmatrix} W_1 \\ W_2 \\ \vdots \\ W_n \end{bmatrix} = \begin{bmatrix} a_{ex} \\ b_{ex} \\ c_{ex} \\ d_{ex} \end{bmatrix}$$

Turning to the analysis or tuning parameters $\lambda$ and $\rho$, while either value can remain set to its default value of 1, analysis parameter $\rho$ can be varied to all values greater than or equal to 1. The sensitivity analysis parameter $\lambda$ can be varied to any value and, preferably, to any positive value and more particularly, can be selected in the range of 1–4.

The computation results of the expected sensor values is subtracted from the actual sensor values to provide a "residual". The residual is also a vector having the same number of elements as the sensor-count, with each element indicating how different the actual value is from the estimated value for that sensor.

So, for example, set forth below is an example of C code for the overall functionality of the inventive similarity operator based upon a modeling technique for the calculation of the similarity between two vectors.

First user specified selectable parameters include:

D: Training matrix; M rows by N columns, where M is the number of variables in the model and N is the number of training vectors chosen from a training data set.

$\lambda$: Non-linearity exponent, i.e., an analysis or coarse tuning parameter.

$\rho$: Scaling factor, i.e., an analysis or fine tuning parameter.

Then, inputs include:

D: The two dimensional training matrix.

M: The number of variables or rows in the D matrix.

N: The number of training vectors or columns in the D matrix.

lambda: OP Non-linearity (coarse) tuning parameter.

pRow: Scaling (fine) tuning parameter.

Outputs are defined as:

R: A range vector defined externally to avoid dynamic memory allocation.

G: The model matrix G calculated as set forth below.

Before real-time monitoring can begin, the global range R for each of the i=1,2, . . . , M variables in the model must be calculated using a representative data set as described hereinabove with reference to FIGS. 5 and 6. If X is a data matrix with rows corresponding to observations and columns to variables, then the range is calculated for each variable as follows.

"$R_i$=max($X(n,i)$)–min($X(n,i)$), over all $n$"

for (column=0; column<M; ++column)

```
{
    min = X[column];
    max = X[column];
    for (row=1; row<N; ++row)
    {
        if (X[row*M + column] < min) min = X[row*M + column];
        if (X[row*M + column] > max) max = X[row*M + column];
    }
    R[column] = max - min;
}
```

Then after determining the ranges $R_i$ for each variable, the OP operator model matrix C can be constructed from an appropriate training matrix D. The model matrix is an N by N square matrix calculated using the OP operator, as follows:

"$G=_{t\otimes\ SSCOP}D$, (where, $\otimes\ _{SSCOP}$ is the SSCOP operator)"

The SSCOP operator measures the similarity between vectors. When calculating C, the similarities between all pairs of column vectors in D are calculated. The SSCOP operator uses the ranges $R_i$, non-linearity analysis parameter $\lambda$, and the scaling analysis parameter $\rho$ to calculate similarity measurements. Performing the following procedure carries out the similarity between two vectors, $d_1$ and $d_2$ in D using SSCOP.

If D contains N column vectors, each including M elements, $$D=[d_1|d_2| \ldots |d_N]$$

$$d_k=[d_1(t) d_2(t) \ldots d_M(t)]$$

then vector similarity is measured as follows:

i) Calculate the elemental similarity angles $\theta_i$ for the $i^{th}$ sensor and each pair of elements in $d_1$ and $d_2$.

$$\theta_i = \frac{\max(d_1(i), d_2(i)) - \min(d_1(i), d_2(i))}{R_i}$$

ii) Calculate the elemental similarity measurements.

$$s_i = 1 - \frac{\theta_i^\lambda}{\rho}$$

iii) Next, calculate the overall vector similarity.

first, if ($S_i$<0), then $S_i$=0

$$S = \frac{1}{M} \sum_{i=1}^{M} S_i$$

These steps are used to calculate the similarity between all combinations of vectors in D to produce G.

So, for example:
Given a data set X, the Range of each variable is $$X = \begin{bmatrix} [2.5674 & -1.1465 & 0.3273] \\ 1.3344 & 1.1909 & 0.1746 \\ 3.1253 & 1.1892 & 0.1867 \\ 3.2877 & -0.0376 & 0.7258] \end{bmatrix};$$

Setting $\rho=2$, $\lambda=3$, and D is $$D = \begin{bmatrix} [2.5674 & 1.3344 & 3.1253 & 3.2877] \\ -1.1465 & 1.1909 & 1.1892 & -0.0376 \\ 0.3273 & 0.1746 & -0.1867 & 0.7258] \end{bmatrix};$$

the resulting model matrix G is then $$G = \begin{bmatrix} [1.0000 & 0.7906 & 0.8000 & 0.9600] \\ 0.7906 & 1.0000 & 0.8612 & 0.7724 \\ 0.8000 & 0.8612 & 1.0000 & 0.8091 \\ 0.9600 & 0.7724 & 0.8091 & 1.0000] \end{bmatrix};$$

and the inverse is (condition number equals 91.7104):

$$Gi = \begin{bmatrix} [13.8352 & -1.8987 & 0.3669 & -12.1121] \\ -1.8987 & 4.3965 & -2.8796 & 0.7568 \\ 0.3669 & -2.8796 & 4.8407 & -2.0446 \\ -12.1121 & 0.7568 & -2.0446 & 13.6974] \end{bmatrix};$$

```
// Next, calculate G from Dt SSCOP D
for (row=0; row<N; ++row)
{
    for (column=0; column<N; ++column)
    {
        G[row*N + column] = 0;
        for (i=0; i<M; ++i)
        {
            if (D[i*N + row] > D[i*N + column])
            {
                theta = (D[i*N + row] - D[i*N + column]) / R[i];
            }
            else
            {
                theta = (D[i*N + column] - D[i*N + row]) / R[i];
            }
            s = 1 - pow(theta, lambda) / pRow;
            if (s < 0) s = 0;
            G[row*N + column] += s;
        }
        G[row*N + column] /= M;
    }
}
```

A statistical significance test is applied to the elements of the residual, or to the residual as a whole. More particularly, a test known as the sequential probability ratio test ("SPRT") is applied to the residual for each sensor. This provides a means for producing an alarm or other indicator of statistically significant change for every sensor in real-time.

The SPRT type of test is based on the maximum likelihood ratio. The test sequentially samples a process at discrete times until it is capable of deciding between two alternatives: $H_0:\mu=0$; and $H_A:\mu=M$. It has been demonstrated that the following approach provides an optimal decision method (the average sample size is less than a comparable fixed sample test). A test statistic, $\Psi_t$, is computed from the following formula:

$$\psi_t = \sum_{i=1+j}^{t} \ln\left[\frac{f_{H_A}(y_i)}{f_{H_0}(y_i)}\right]$$

where $\ln(\cdot)$ is the natural logarithm, $f_{H_s}(\ )$ is the probability density function of the observed value of the random variable $Y_i$ under the hypothesis $H_s$ and j is the time point of the last decision.

In deciding between two alternative hypotheses, without knowing the true state of the signal under surveillance, it is possible to make an error (incorrect hypothesis decision). Two types of errors are possible. Rejecting $H_0$ when it is true (type I error) or accepting $H_0$ when it is false (type II error). Preferably these errors are controlled at some arbitrary minimum value, if possible. So, the probability of a false alarm or making a type I error is termed $\alpha$, and the probability of missing an alarm or making a type II error is termed $\beta$. The well-known Wald's Approximation defines a lower bound, L, below which one accepts $H^0$ and an upper bound, U beyond which one rejects $H_0$.

$$U = \ln\left[\frac{1-\beta}{\alpha}\right]$$

$$L = \ln\left[\frac{\beta}{1-\alpha}\right]$$

Decision Rule: if $\Psi_t<L$, then ACCEPT $H_0$;
else if $\Psi_t <U$, then REJECT $H_0$; otherwise, continue sampling.

To implement this procedure, this distribution of the process must be known. This is not a problem in general, because some a priori information about the system exists. For this purpose, the multivariate Normal distribution is satisfactory.

For a typical sequential test $$\psi_{t+1} = \psi_t + M\overline{I}\sum^{-1}\left(\overline{y}_{t+1} + \frac{M\overline{I}}{2}\right)$$

where M is the system disturbance magnitude and $\overline{Y}$ is a system data vector.

Figure 7:
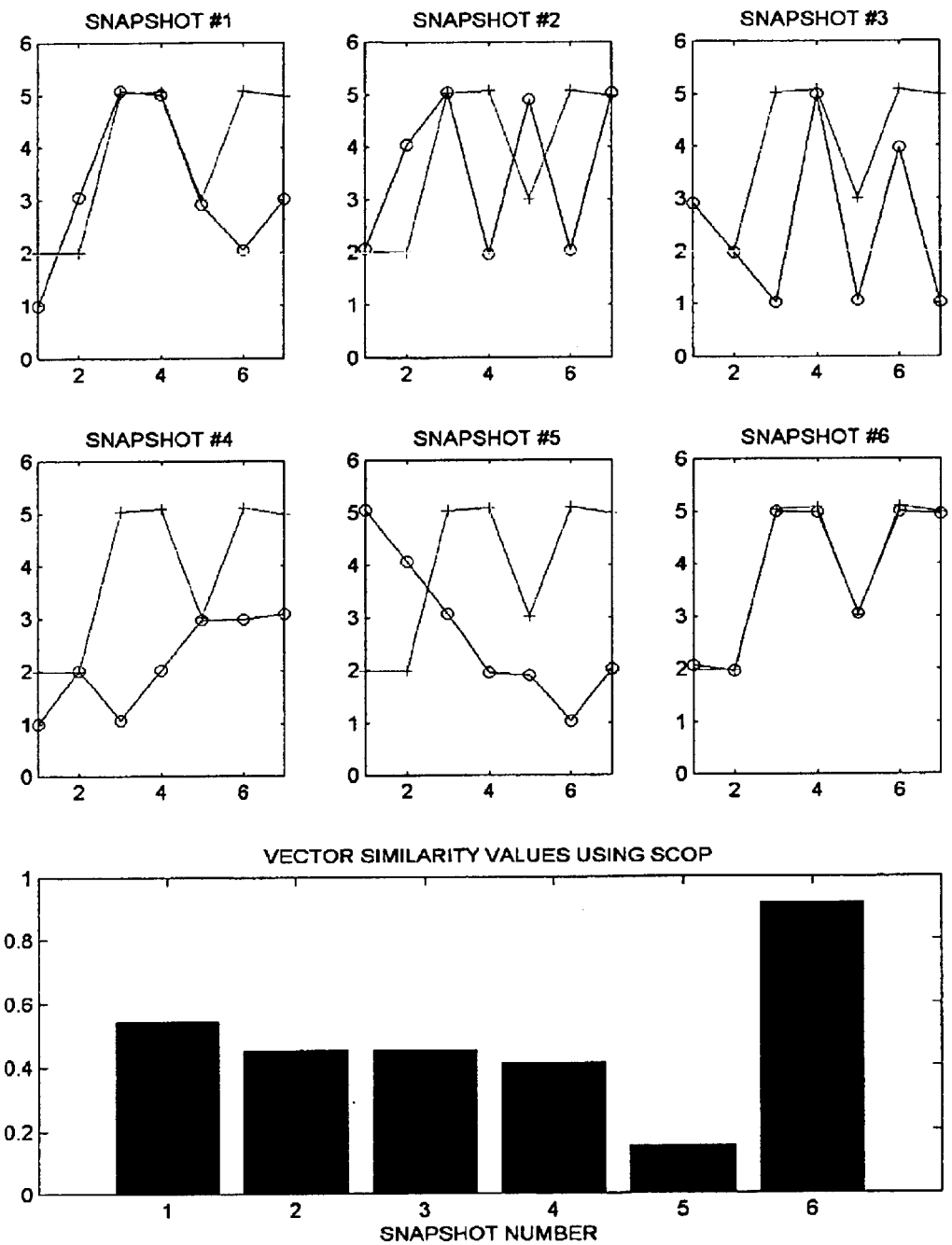
FIG. 7 and FIG. 8 show snapshot numbers 1–6 as deviating signals and noise additive signals respectively with associated vector similarity values using a similarity operator in accordance with the invention.

FIG. 7 shows deviating signals for snapshots numbered 1–6 with associated vector similarity values using the inventive similarity operator. These six separate examples show vector-to-vector similarity graphically depicted. In each snapshot chart, the x-axis is the sensor number, and the y-axis is the sensor value. Each snapshot comprises 7 sensor values, that is, seven elements. The two lines in each chart show the two respective snapshots or vectors of sensor readings. One snapshot may be from real-time data, e.g., the current snapshot, and the other snapshot may be from the D matrix the comprises the model. Using the inventive similarity operator described above, element-to-element similarities are computed and averaged to provide the vector-to-vector similarities shown in the bar chart in FIG. 7. It can be seen that the similarity comparison of snapshot chart #6 renders the highest similarity scalar, as computed using the similarity operator of the present invention. These similarity scalars are used in computing estimates as described above, with regard to the generation of W.

Figure 8:
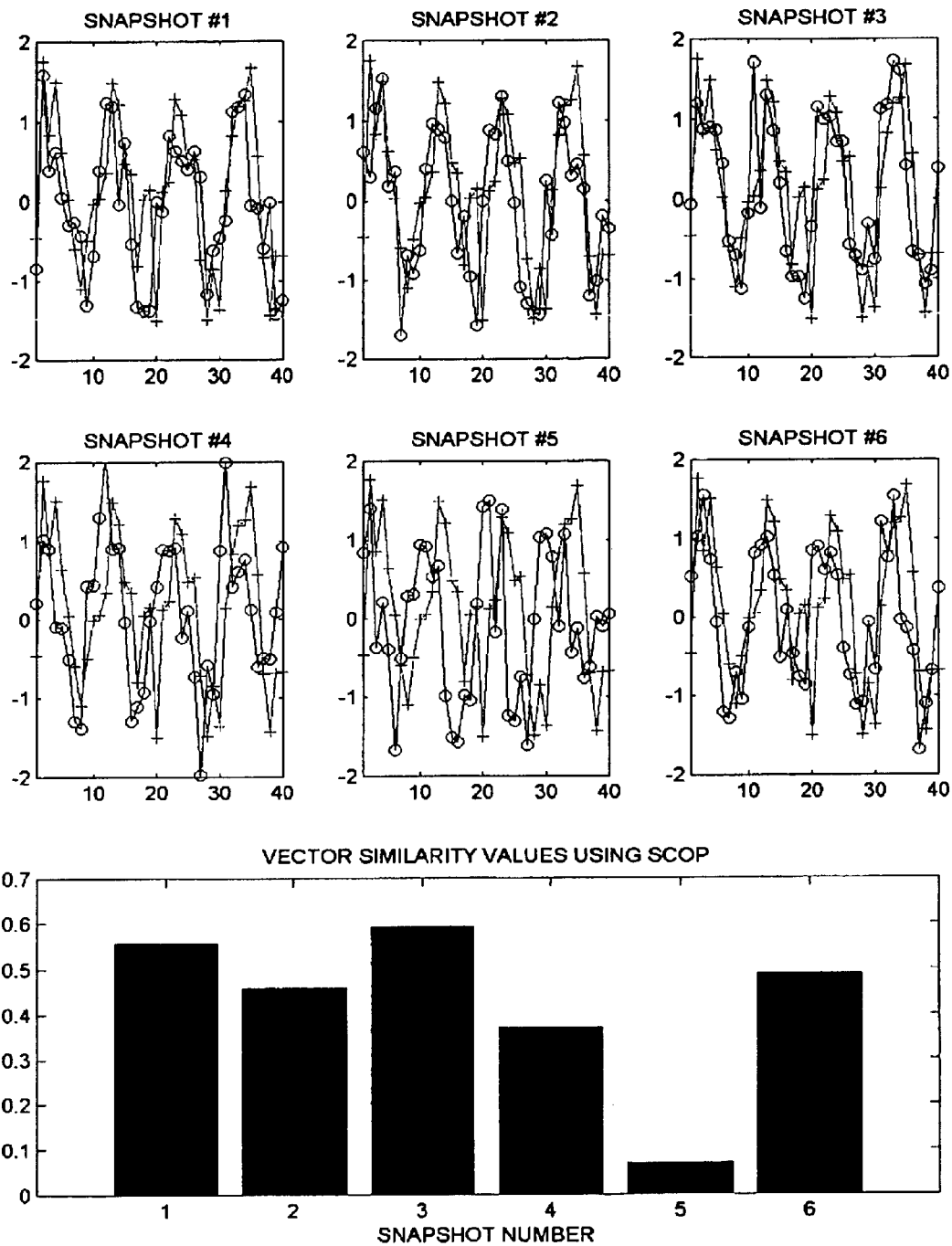

FIG. 8 shows noise additive signals for snapshots numbered 1–6 with associated vector similarity values using the inventive similarity operator. The output of the similarity engine can be similarity values, expected values, or a "residual," i.e., the difference between the actual and expected values. A more typical set of examples of sensor data with noise are depicted in six snapshot charts, this time comprising 40 sensor elements. Each chart again contains two lines, one for each of two snapshots being compared using the similarity operator of the present invention, these charts are far more difficult to compare visually with the eye. The similarity operator scalar results are shown in the bar chart of FIG. 8, which provides an objective measure of which vector-to-vector comparison of the set of six such comparisons actually has the highest similarity. Again, the similarity values can be output as results (e.g., for classification purposes when comparing a current snapshot to a library of classified snapshots) or as input to the generation of estimates according to the equations described above, which ultimately can be used for monitoring the health of the monitored process or machine.

Figure 9A:
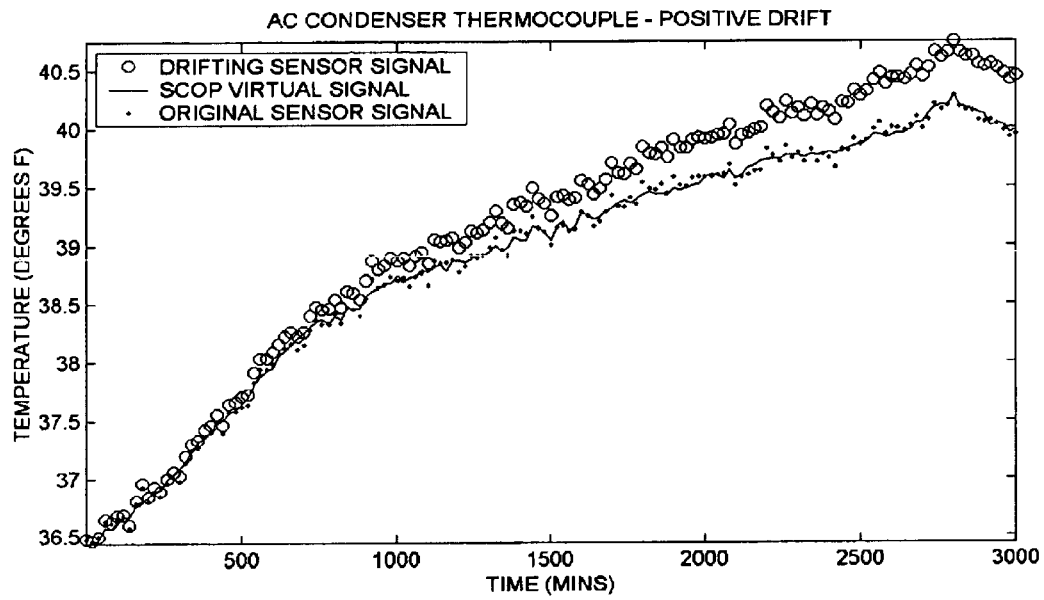
FIGS. 9A and 9B illustrate a sensor input signal from an air conditioning condenser thermocouple showing positive drift, with FIG. 4A illustrating the residual signal resulting from the drift as deviating over time.
Figure 9B:
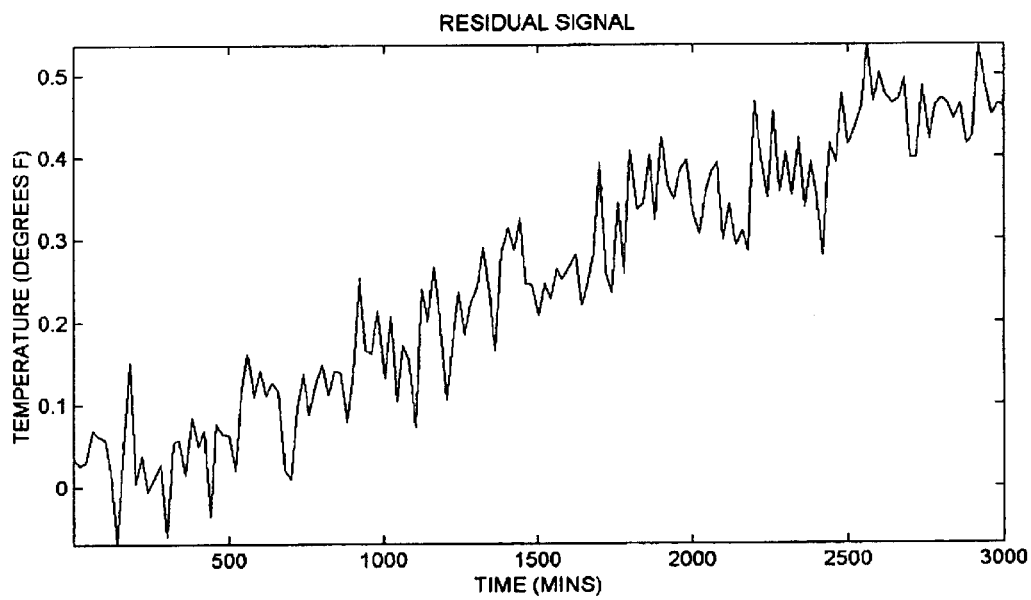

FIGS. 9A and 9B illustrate a sensor input signal from an air conditioning condenser thermocouple showing positive drift, with FIG. 9A illustrating the residual signal resulting from the drift as deviating over time. In FIG. 9A, it can be seen that the drifted "actual" sensor signal and the estimated signal generated using the similarity operator of the present invention generate a difference or "residual" that grows in FIG. 9B as the estimate and actual diverge. The estimate clearly follows the original pre-drift sensor value that the drifted sensor was based on.

Figure 10A:
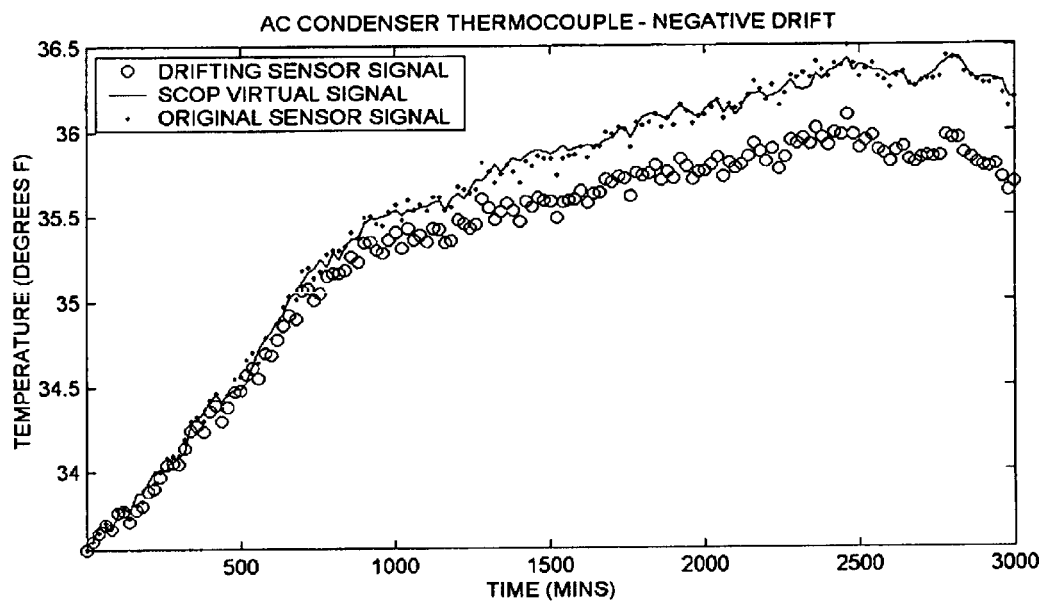
FIGS. 10A and 10B illustrate the residual signal generated in response to negative drift on the sensor input.
Figure 10B:
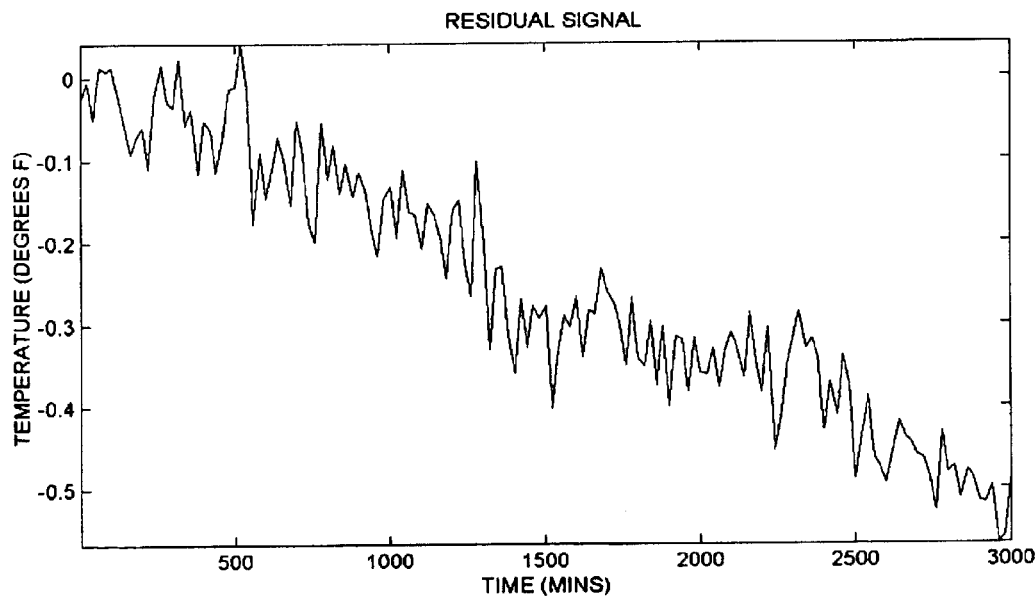

FIGS. 10A and 10B illustrate an example of a residual signal generated in response to negative drift on the sensor input. Because the drift is in the opposite direction, it is negative and the estimate again follows what the sensor should have been. Note that the residual shown in FIG. 10B is actually growing in the negative direction.

Figure 11A:
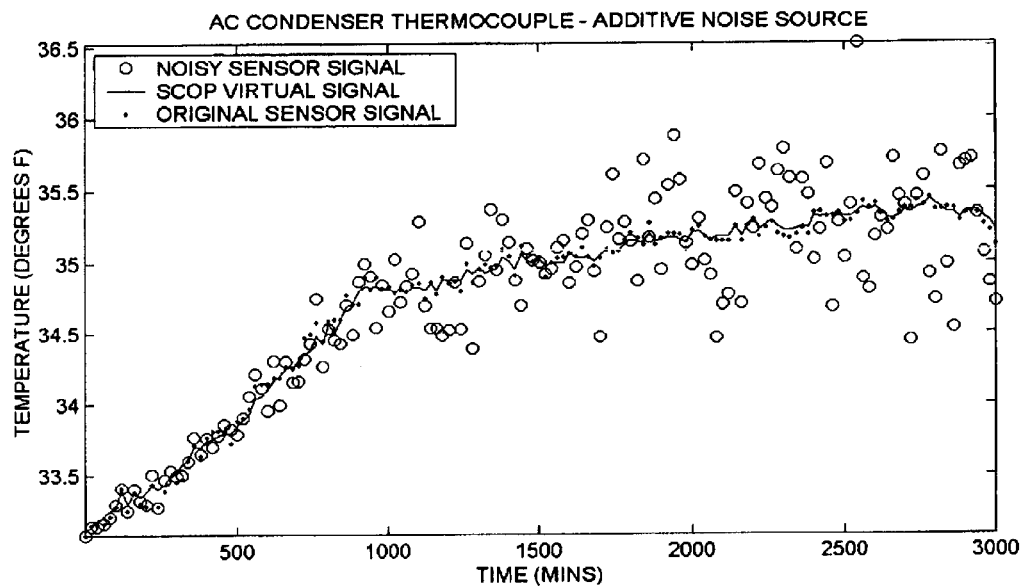
FIGS. 11A and 11B illustrate the introduction of additive noise to the sensor input and the corresponding residual signal.
Figure 11B:
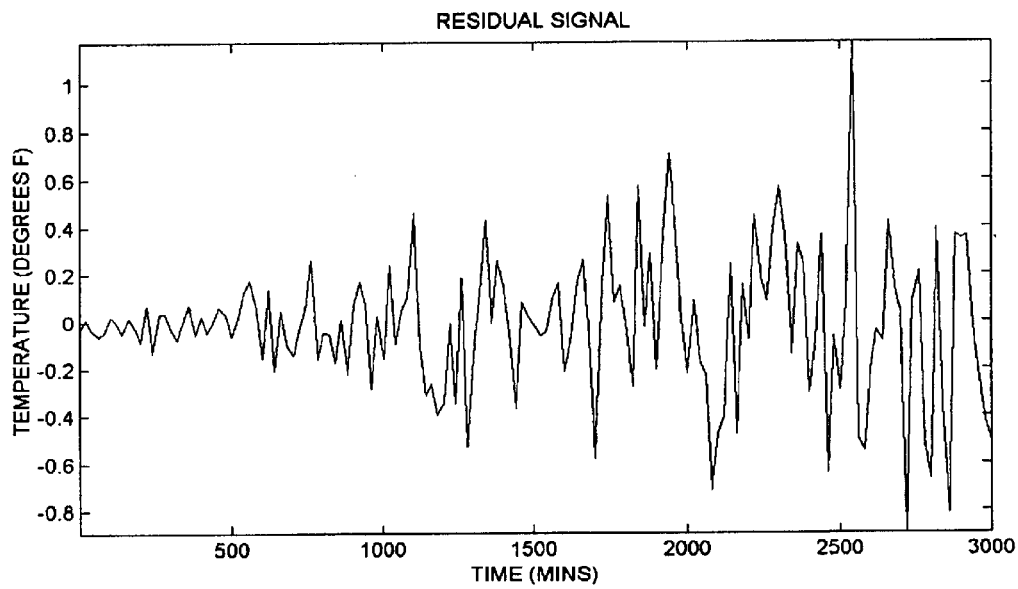

FIGS. 11A and 11B illustrate an example of the introduction of additive noise to the sensor input and the corresponding residual signal. Note that the failing sensor is actually getting noisier, and the similarity estimate remains close to the pre-failed sensor signal on which the noisy signal was based. The residual in FIG. 11B swings wider and wider, which would be easily detected in the SPRT-based statistical decision engine and alarmed on.

Thus, the present invention provides a superior system modeling and monitoring tool for ultra sensitive signal differentiation accurately detecting system parametric deviations indicative of more subtle underlying system or system component changes, whether the system is a machine, a process being carried out in a closed system, a biological system or any other such system. The tool differentiates between anomalous results caused by defective sensors and component related failures, allowing adjustment therefor. Further, the signal differentiation sensitivity of the tool far exceeds prior art thresholding results using less memory and computer power to consider larger volumes of data, interactively if desired, irrespective of available computer power.

It will be appreciated by those skilled in the art that modifications to the foregoing preferred embodiments may be made in various aspects. The present invention is set forth with particularity in the appended claims. It is deemed that the spirit and scope of that invention encompasses such modifications and alterations to the preferred embodiment as would be apparent to one of ordinary skill in the art and familiar with the teachings of the present application.

What is claimed is:

1. A tool for system modeling and monitoring a system with a plurality of sensors, each sensor generating a signal representative of a system parameter, said tool comprising:

a memory storing a plurality of historical snapshots of one or more sensor signals, said plurality of snapshots forming a training matrix ($\overline{D}$) corresponding to a universe of identified states of a monitored system;

a data acquisition unit receiving signals from said sensors, each received signal being representative of a system parameter at a selected time;

an information processor coupled to said data acquisition unit acquiring real-time snapshots as state vectors ($\vec{Y}_{input}$) indicative of observed states of said monitored system;

a similarity operator (($\overline{x}$)$_{SSCOP}$) implemented within said information processor operable on state vectors with said training matrix from said memory to determine similarity as a function of the absolute difference between like sensor values divided by expected sensor ranges such that similarities S(i) between a state vector and the historical snapshots D(i) is given by:

$\overline{S} = \overline{D}'(\overline{x})_{SSCOP} \vec{Y}_{input}$ and similarity has the form $$s_i = 1 - \frac{\theta_i^\lambda}{\rho}$$

where $\theta_i$ represents the normalized similarity between a parameter and its corresponding value in one of said training vectors, $\lambda$ is a coarse tuning parameter and $\rho$ is a fine tuning parameter; and said information processor generating an expected state vector ($\vec{Y}_{expected}$) responsive to said similarity operator.

2. A tool as in claim 1, wherein the information processor further comprises:

an adder adding comparison results between two vectors; and a divider dividing a sum from said adder by the number of parameters being compared in said two vectors.

3. A tool as in claim 2, wherein the information processor further comprises:

matrix transposition means for generating the transpose of a matrix; and matrix multiplication means for multiplying training set by a weight unit vector $\overline{W}$ to said generate said expected state vector;

whereby $\overline{D}'$ is the transpose of training matrix $\overline{D}$, $\overline{G} = (\overline{D}'(\overline{x})_{SSCOP}\overline{D})$, $\overline{S} = \overline{D}'(\overline{x}) \vec{y}_{input}$, $\overline{G}^{-1}$ is the inverse of $\overline{G}$, the weight unit vector is defined as:

$\overline{W} = \overline{G}^{-1} \cdot \overline{S}$ and $\vec{y}_{expected} = \overline{D} \cdot \vec{W}$.

4. A tool as recited in claim 1, wherein said data acquisition unit comprises a personal computer based data acquisition board receiving sensor data from said sensors.

5. A tool as recited in claim 1, wherein said monitored system is selected from the group consisting of a machine, a process and a biological system.

6. A tool as recited in claim 1, said expected state vector being compared with a corresponding real time snapshot, expected state vector parameters being compared against corresponding real-time sensor signals, said information processor logging any differences indicated in said comparison.

7. A tool as recited in claim 6 further comprising a monitoring device for generating an alarm signal indicative of a difference between a current state and known normal states of operation of the monitored system based upon the similarity measure determined with said similarity operator.

8. A method of empirically monitoring a system comprising:
   a) building a training set matrix ($\overline{D}$) of historical system snapshots, said training set matrix describing a universe of identified states of a system being monitored;
   b) receiving a state vector representative of an actual state of said monitored system, said state vector including a plurality of time related sensor parameter values;
   c) comparing said received state vector ($\vec{Y}_{input}$) against vectors from said training set matrix to provide measures of similarity to said received state vector and states in said training set matrix based on the absolute difference of corresponding sensor values, normalized by the expected range of each sensor according to the relationship:

$$s_i = 1 - \frac{\theta_i^\lambda}{\rho}$$

where θi represents the normalized similarity between a parameter and its corresponding value in one of said training vectors, λ is a coarse tuning parameter and ρ is a fine tuning parameter; and
   d) generating an estimated state vector ($\vec{Y}_{expected}$) from results of the comparison step (c).

9. A method as recited in claim 8, further comprising:
   f) generating an alarm signal indicative of a difference between the actual state and the estimated state of operation of the monitored system.

10. A method as recited in claim 9, wherein the alarm generating step (f) comprises applying a sequential probability ratio test (SPRT) to successive differences between successive actual states and estimated states.

11. A method as recited in claim 8, wherein the received state vector is augmented with parameter values generated for one or more virtual sensors.

12. A method as recited in claim 8, wherein the comparison step (c) comprises:
   i) generating an operator model matrix ($\overline{G}$);
   ii) generating a similarity vector ($\vec{S}$); and
   iii) generating a weight vector ($\vec{W}$) from said operator model matrix and said similarity vector.

13. A method as in claim 12, wherein the step (i) of generating the operator model matrix (G) comprises comparing the transpose of the training matrix against the training matrix ($\overline{D}'\otimes_{SSCOP} \overline{D}$), each element comparison having the form:

$$s_i = 1 - \frac{\theta_i^\lambda}{\rho}$$

where $\theta_i$ represents said measures of similarity between said received state vector and states in said training set matrix, λ is a coarse tuning parameter and ρ is a fine tuning parameter.

14. A method as in claim 13, wherein the step (ii) of generating a similarity vector comprises comparing for similarity said state vector with the transpose of said training set matrix ($\overline{D}'\otimes \vec{y}_{input}$).

15. A method as in claim 14, wherein the step (iii) of generating a weight vector has the form:

$$\vec{W} = \overline{G}^{-1} \cdot \vec{S}.$$

16. A method as in claim 15, wherein the step (d) of generating the estimated state vector has the form:

$$\vec{y}_{estimated} = \overline{D} \cdot \vec{W}.$$

17. A method as in claim 16, wherein said system being monitored is selected from the group consisting of a machine, a process being carried out in a closed system and a biological system.

18. A method as in claim 13, wherein tuning parameters ρ and λ are selectively chosen between 1 and 4.

19. A method as in claim 18 wherein for two parameters $a_1$, $a_2$ in a space, $$\theta_a = \frac{\max(a_1, a_2) - \min(a_1, a_2)}{(\text{Max}_a - \text{Min}_a)},$$

$\text{Min}_a$ and $\text{Max}_a$ being the range limits in a-space.

20. A computer program product for empirically monitoring a system, said computer program product comprising a computer usable medium having computer readable program code thereon, said computer readable program code comprising:
   computer readable program code means for receiving state vectors representative of actual states of a system being monitored, each said state vector including a plurality of time related sensor parameter values;
   computer readable program code means for building a training set matrix ($\overline{D}$) of historical system snapshots, said training set matrix describing a universe of acceptable states of said monitored system;
   computer readable program code means for comparing said received state vector ($\vec{Y}_{input}$) against vectors from said training set matrix using a similarity operation according to the relationship $$s_i = 1 - \frac{\theta_i^\lambda}{\rho}$$

where θi represents the normalized similarity between a parameter and its corresponding value in one of said training vectors, λ is a coarse tuning parameter and ρ is a fine tuning parameter;
   computer readable program code means for generating expected state vectors ($\vec{Y}_{expected}$) from results of said comparison; and
   computer readable program code means for generating an alarm signal indicative of a difference between the operational state and normal states of operation of the monitored system, based on estimates.

21. A computer program product for empirically monitoring a system as in claim 20, wherein the computer readable program code means for generating the alarm comprises:
   computer readable program code means for applying a sequential probability ratio test (SPRT) to the difference between input sensor data and estimated sensor data.

22. A computer program product for empirically monitoring a system as in claim 20, wherein the computer readable program code means for comparing vectors comprises:

computer readable program code means for generating an operator model matrix ($\overline{\overline{G}}$);

computer readable program code means for generating a similarity vector ($\vec{S}$); and computer readable program code means for generating a weight vector ($\vec{W}$) from said operator model matrix and said similarity vector.

23. A computer program product for empirically monitoring a system as in claim 22, wherein the computer readable program code means for generating the operator model matrix (G) transposes the training matrix and compares the transposed training matrix against the training matrix ($\overline{\overline{D}}' \otimes_{SSCOP} \overline{\overline{D}}$), each element comparison having the form:

$$s_i = 1 - \frac{\theta_i^2}{\rho}$$

where $\theta_i$ represents the normalized similarity between a parameter and its corresponding value in one of said training vectors, $\lambda$ is a coarse tuning parameter and $\rho$ is a fine tuning parameter.

24. A computer program product for empirically monitoring a system as in claim 23, wherein the computer readable program code means for generating a similarity vector compares said state vector with the transpose of said training set matrix ($\overline{\overline{D}}' \otimes \vec{y}_{input}$).

25. A computer program product for empirically monitoring a system as in claim 24, wherein the weight vector is generated according to:

$$\vec{W} = \overline{\overline{G}}^{-1} \cdot \vec{S}.$$

26. A computer program product for empirically monitoring a system as in claim 25, wherein the expected state vector is generated according to:

$$\vec{y}_{estimated} = \overline{\overline{D}} \cdot \vec{W}.$$

27. A computer program product for empirically monitoring a system as in claim 26, said system being selectable from the group consisting of a machine, a process being carried out in a closed system and a biological system.

28. An apparatus for monitoring an operating condition of a selected system, comprising:

a first data source for providing reference data characteristic of an operating condition of a reference system;

a second data source for providing selected data characteristic of an operating condition of said selected system;

a similarity module operative to determine at least one measure of similarity of said selected data for said selected system relative to said reference data of said reference system, by dividing the absolute difference of related data points from said selected data and said reference data, by an expected range of the related data points in said reference data, and subtracting from one.

29. An apparatus according to claim 28 further comprising an estimation module operative to generate an estimate of said selected data based on said measure of similarity.

30. An apparatus according to claim 29 further comprising a test module operative to perform a statistical hypothesis test on said selected data and said estimate thereof, said test indicating if there is a statistically significant deviation between them.

31. An apparatus according to claim 30 wherein said statistical hypothesis test is a sequential probability ratio test.

32. An apparatus according to claim 28, wherein said measures of similarity for two related data points from said selected data and said reference data is provided according to:

$$s = 1 - \left(\frac{|d_1 - d_2|}{\text{Range}}\right)^2 \Big/ \rho$$

where $d_1$ and $d_2$ are said two related data points, and $\lambda$ and $\rho$ are selected constants.

33. An apparatus according to claim 32, wherein $\lambda$ is selected in the range of 1 to 4.

34. An apparatus according to claim 32, wherein $\rho$ is selected in the range of 1 to 4.

35. A similarity engine, comprising:

a memory for storing a plurality of known state vectors;

an input bus for providing a current state vector; and a processor disposed to render a measure of similarity between the current state vector from said input bus and a selected known state vector from said memory, equal to a statistical combination of a set of similarity values for corresponding elements of the current state vector and the selected known state vector, where a similarity value for a comparison of an element from the current state vector to a corresponding element from the selected known state vector is proportional to the quantity of one minus a quantity theta, theta being the absolute difference of said corresponding elements divided by the range of values for corresponding elements across the plurality of known state vectors.

36. A similarity engine according to claim 35, wherein said similarity value for a comparison of said corresponding elements of the current state vector and the selected known state vector is equal to theta raised to a power, then divided by a constant, with this result subtracted from one.

37. A similarity engine according to claim 35, wherein said measure of similarity between said current state vector and said selected known state vector is equal to the arithmetic means of all quantities theta for each corresponding pair of elements from said two vectors, subtracted from one.

38. A similarity engine according to claim 35, wherein said measure of similarity between said current state vector and said selected known state vector is equal to the arithmetic mean of all similarity values for each corresponding pair of elements from said two vectors.

39. A similarity engine according to claim 35, wherein said measure of similarity between said current state vector and said selected known state vector is equal to the median of all similarity values for each corresponding pair of elements from said two vectors.

40. A similarity engine according to claim 35, wherein said processor is further disposed to generate an estimated state vector in response to input of said current state vector, using at least some of said plurality of known state vectors and at least one said measure of similarity.

41. A similarity engine according to claim 40, wherein said processor is further disposed to compare said estimated state vector and said current state vector.

42. A similarity engine according to claim 41, wherein said processor employs a statistical test to a sequence of comparisons of said estimated state vectors and said current state vectors.

43. A method for determining a measure of similarity between a current sate of a system and a previously known state of the system comprising the steps of:

acquiring sensor values from a set of sensors indicative of said current state;

for each sensor in said set:

determining an expected range over prior known values of the sensor, determining the absolute value of the difference of the current state sensor value and the sensor value from the previously known state, and calculating a similarity value for the sensor between its current state value and its previously known state value as a function of the result of said absolute value divided by said range equal to the quantity of said absolute value divided by said range, said quantity being raised to a power and divided by a constant, subtracted from one; and statistically combining the similarity values for the set of sensors to provide a measure of similarity between the current state and the previously known state.

44. A method according to claim 43, wherein said step of statistically combining comprises calculating the arithmetic mean of the similarity values of the set of sensors.

45. A method according to claim 43, wherein said step of statistically combining comprises calculating the median of the similarity values of the set of sensors.

46. A method according to claim 43, wherein said step of statistically combining comprises averaging quantities equal to for each sensor, said absolute value divided by said range, and subtracting from one a value based on the average.

47. A method according to claim 46, wherein the average is raised to a power, then divided by a constant, and then subtracted from one.

* * * * *